United States Patent
Edler

(10) Patent No.: US 7,219,584 B2
(45) Date of Patent: *May 22, 2007

(54) INDEXIBLE TURNING TOOL FOR CHIP FORMING MACHINE

(75) Inventor: Daniel Edler, Fåker (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/286,901

(22) Filed: Nov. 23, 2005

(65) Prior Publication Data

US 2006/0075858 A1    Apr. 13, 2006

Related U.S. Application Data

(63) Continuation of application No. 10/692,864, filed on Oct. 27, 2003, now Pat. No. 7,021,182.

(30) Foreign Application Priority Data

Oct. 31, 2002   (SE) .................................... 0203199

(51) Int. Cl.
   *B23B 29/24*    (2006.01)
(52) U.S. Cl. ............................ 82/121; 82/159; 407/99
(58) Field of Classification Search .................. 407/66, 407/67, 99, 82, 103, 121, 158, 159

See application file for complete search history.

(56) References Cited

U.S. PATENT DOCUMENTS

| 3,540,323 | A | * | 11/1970 | Rishel ..................... 408/186 |
| 4,194,862 | A | * | 3/1980 | Zweekly .................. 408/224 |
| 4,475,853 | A | | 10/1984 | Morgan |
| 6,708,382 | B2 | | 3/2004 | Yamazaki et al. |
| 6,715,386 | B2 | | 4/2004 | Maier |
| 6,901,642 | B2 | | 6/2005 | Rydberg |
| 2003/0082018 | A1 | * | 5/2003 | Kraemer .................... 407/11 |
| 2004/0177491 | A1 | | 9/2004 | Pinger et al. |

FOREIGN PATENT DOCUMENTS

| EP | 1070563 | | 1/2001 |
| EP | 1186367 | | 3/2002 |
| EP | 1317981 | A1 | 6/2003 |

* cited by examiner

*Primary Examiner*—Daniel W. Howell
*Assistant Examiner*—Sara Addisu
(74) *Attorney, Agent, or Firm*—Drinker Biddle & Reath LLP

(57) ABSTRACT

An indexible turning tool for chip forming machining, includes a holder equipped with insert pockets receiving replaceable inserts, as well as a securing portion intended to be received in a tool machine. At least one of the replaceable inserts has a main plane that extends laterally in relation to the tool's axial direction.

19 Claims, 5 Drawing Sheets

INDEXIBLE TURNING TOOL FOR CHIP FORMING MACHINE

This application is a continuation application of co-pending U.S. patent application Ser. No. 10/692,864, filed on Oct. 27, 2003, now U.S. patent application Ser. No. 7,021,182 B2, which application claims priority under 35 U.S.C. §§119 and/or 365 to patent application Ser. No. 0203199-5 filed in Sweden on Oct. 31, 2002, the entire content of which is hereby incorporated by reference.

BACKGROUND OF THE INVENTION

The present invention relates to a turning tool for chip forming machining, wherein the tool includes a holder, which is equipped with insert pockets for occupying interchangeable inserts, as well as a securing portion, which is intended to be received in a tool machine. The turning tool according to the present invention is preferably intended for metal machining.

In a brochure from Mapal published in September 2002 there is previously known a milling tool for chip forming machining, wherein said milling tool has inserts oriented laterally from a longitudinal axial direction for the tool, i.e., they are situated on the front surface of said milling tool. It shall be emphasized in this connection that it is a rotary tool, and therefor the forces which affect the inserts are not comparable to the forces which affect an insert on a turning tool.

A primary purpose of the present invention is to provide a turning tool of the above-captioned type, which promotes the tool's availability for different machining operations.

Another purpose of the present invention is to reduce the setting time between different types of working operations, for example turning and threading

SUMMARY OF INVENTION

At least the primary purpose of the present invention is achieved by an indexible turning tool which comprises a tool body that includes a securing portion and a holder. The holder is provided with pockets which receive respective replaceable cutting inserts. The pockets are arranged wherein indexing of the tool body about a longitudinal center axis of the holder brings one of the inserts into an operative cutting position. One of the inserts has a main plane oriented laterally relative to the holder's center axis.

DESCRIPTION OF THE DRAWINGS

A number of embodiments of the tool according to the present invention are described below, wherein reference is made to the drawings.

DESCRIPTION OF PREFERRED EMBODIMENTS OF THE INVENTION

The present invention relates to a turning tool, wherein a "turning tool" of the present invention shall understood to be a non-rotary tool which for example can perform cutoff operations, grooving, turn milling, etc. The turning tool is indexible about a longitudinal center axis to enable one of a plurality of exchangeable cutting inserts to be placed in an operative cutting position. Additionally, each of the inserts is itself indexible.

Figure 1:
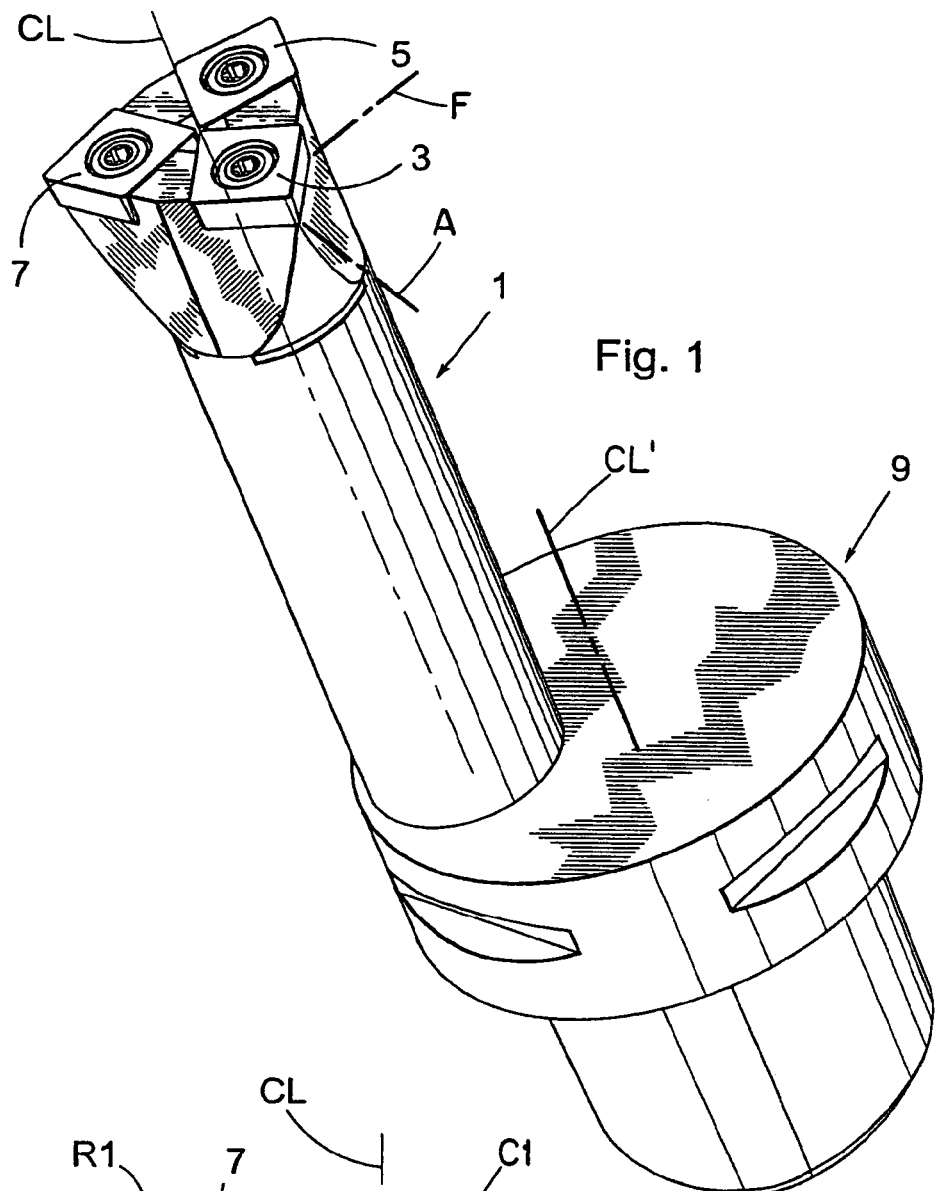
FIG. 1 shows, in a perspective view, an embodiment of an indexible turning tool according to the present invention.

The tool according to the present invention as shown in FIG. 1 comprises a tool body that includes a holder 1 and a securing portion 9. The holder 1 is provided at its free end with a number of insert pockets for receiving replaceable, indexible inserts 3, 5, 7, the number of which in the shown embodiment being three.

All inserts 3–7 are oriented such that their respective main planes P extend laterally in relation to the longitudinal center axis CL of the holder. The "main plane" shall be understood as a plane which coincides with the bottom surface of the insert.

As is shown in FIG. 1 the holder 1 is non-centrally (i.e., eccentrically) located on the securing portion 9 of the tool body, which is intended to be tightened firmly in a tool machine. The reason why the eccentric placement of the holder 1 is possible is that the tool according to the present invention is a turning tool and thus does not rotate during operation. However, it is possible to index the tool, i.e. rotate the securing portion 9 about an indexing axis in order to feed a new insert to an operative cutting location. That is, the indexing of the tool can take place by rotating the holder 1 about its longitudinal center axis CL which would thus define an indexing axis. Alternatively, or additionally, indexing could take place by rotating the securing portion 9 about its longitudinal center axis CL' which would thus define an indexing axis.

Figure 2:
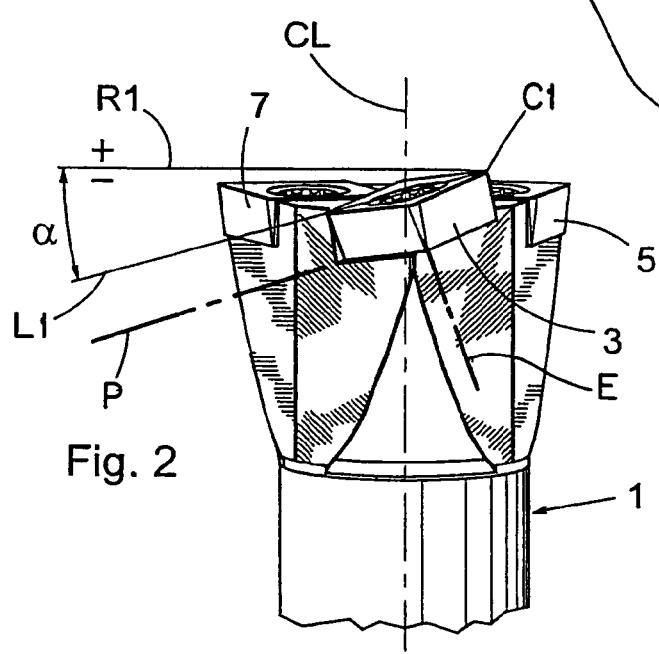
FIG. 2 shows a detail of the cutting head of the tool according to FIG. 1; wherein the cutting head is provided with three exchangeable (replaceably) inserts.

In FIG. 2 the inserts 3, 5, 7 are shown more in detail, wherein the insert 3 has been inclined such that its main plane P forms an acute angle α with a perpendicular reference plane oriented perpendicularly to the holder's center axis CL, and wherein the angle α lies in a tangential reference plane i.e., a plane oriented generally tangentially relative to a radius of the holder. Such an inclination could be achieved, for example, by rotating the insert 3 of FIG. 1 about an axis A defined by a radius of the holder 1 that passes through the insert's center axis E (see FIG. 2 for the axis E). From FIG. 2 it will be appreciated that a line L1 extending parallel to the main plane P from an axially forwardmost corner C1 of the insert's front cutting face and through the insert's center axis E forms the angle α with a reference line R1 that lies in the perpendicular reference plane and also passes through both the insert's center axis E and the axially forwardmost corner of the insert's front cutting face. The angle α has suitably a value in the range $-45° \leq \alpha \leq +45°$ wherein the angle is measured from the reference line RI, and where the angle α is positive above the reference line R1 and negative under the reference line R1.

Figure 3:
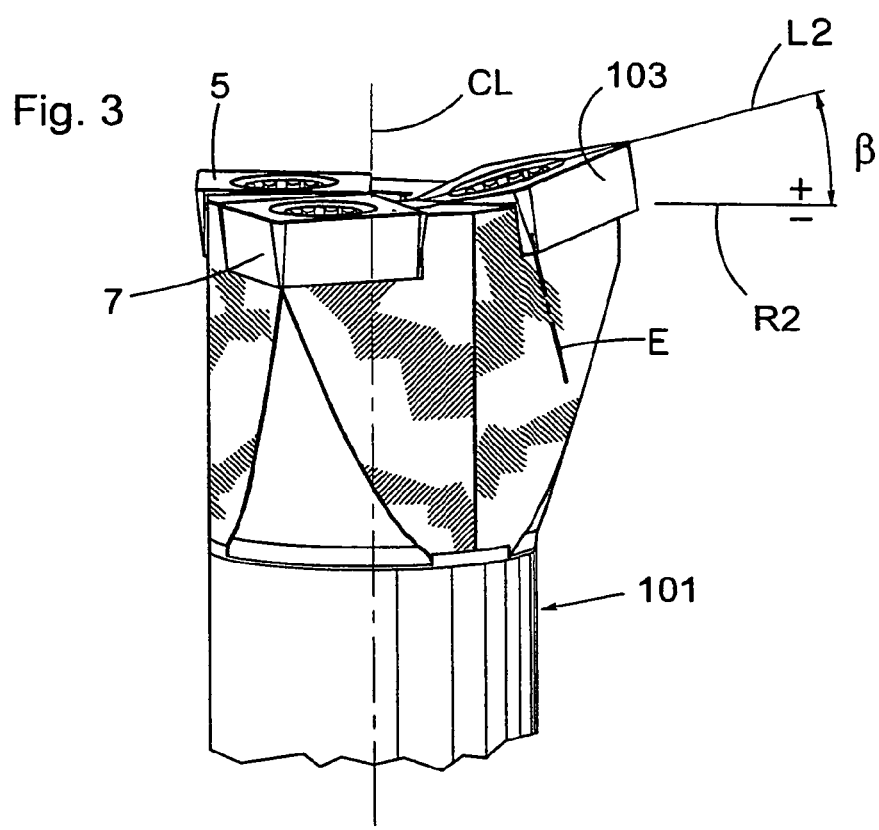
FIG. 3 shows a detail.

In FIG. 3 is shown how corresponding insert 103 on an alternative holder 101 has been inclined at an angle β such that the main plane P forms an acute angle β with a perpendicular reference plane, i.e., a plane oriented perpendicularly to the holder's center axis CL, wherein the angle β lies in an axial reference plane i.e., a plane that contains the holder's center axis CL. The angle β could be formed, for example, by rotating the insert 3 of FIG. 1 about an axis F which is: (i) oriented tangent to a radius of the holder 1 and (ii) extends through the insert's center axis E. It will be appreciated that a line L2 extending parallel to the main plane of the insert 103 from an axially rearmost corner of a front cutting face of the insert and through the insert's center axis E forms the angle β with a reference line R2 which lies in the perpendicular reference plane and which also passes through both the insert's center axis E and the axially rearwardmost corner of the insert's front cutting face. The axially rearwardmost corner of the insert's front cutting face lies adjacent the holder's center axis CL. The angle β has suitably a value in the range −45°≦β≦+45°, wherein the angle is measured from the reference line R2, and where the angle β is positive above the reference line R2 and negative under the reference line R2.

It will also be appreciated that within the scope of the invention, an insert could be inclined by both of the angles α and β.

A important feature of the present invention is that the main plane of each of the inserts 3; 103, 5, 7 has a dimension extending laterally in relation to the axial direction CL of the holder 1; 101, wherein according to the present invention also the inserts 3; 103 are regarded as extending laterally across the axial direction CL despite the fact that they are inclined at a certain angle. Generally, this expression "laterally" is given such an interpretation that not only is the insert located in a plane perpendicularly towards the axial direction CL is included but also the insert is inclined within the indicated angular range.

Figure 4:
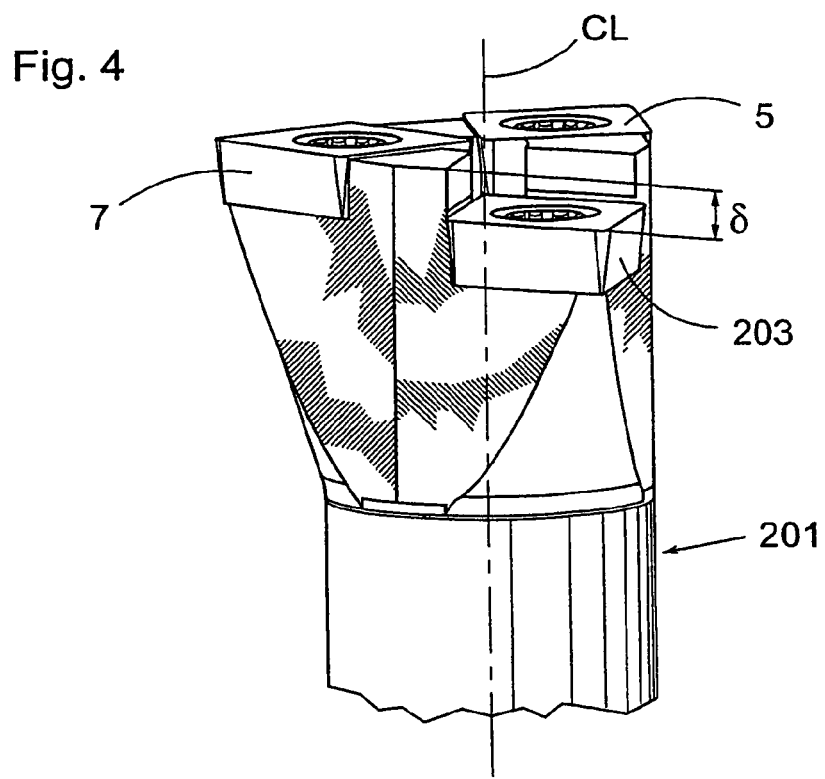
FIG. 4 shows a detail of an alternatively cutting head.

With the embodiment shown in FIG. 4, insert 203 on an alternative holder 201 has been displaced a certain distance d in the axial direction CL relative to the remaining inserts 5 and 7. This promotes the tool's availability to the work piece when chip forming machining is conducted. As shown in FIG. 4 each of the inserts 203, 5, 7 is oriented substantially perpendicular to the axis CL. However, one can within the limits of the invention make arrangement such that or some of the inserts 203, 5, 7 are inclined in the manner shown in FIG. 2 and/or 3.

Figure 5:
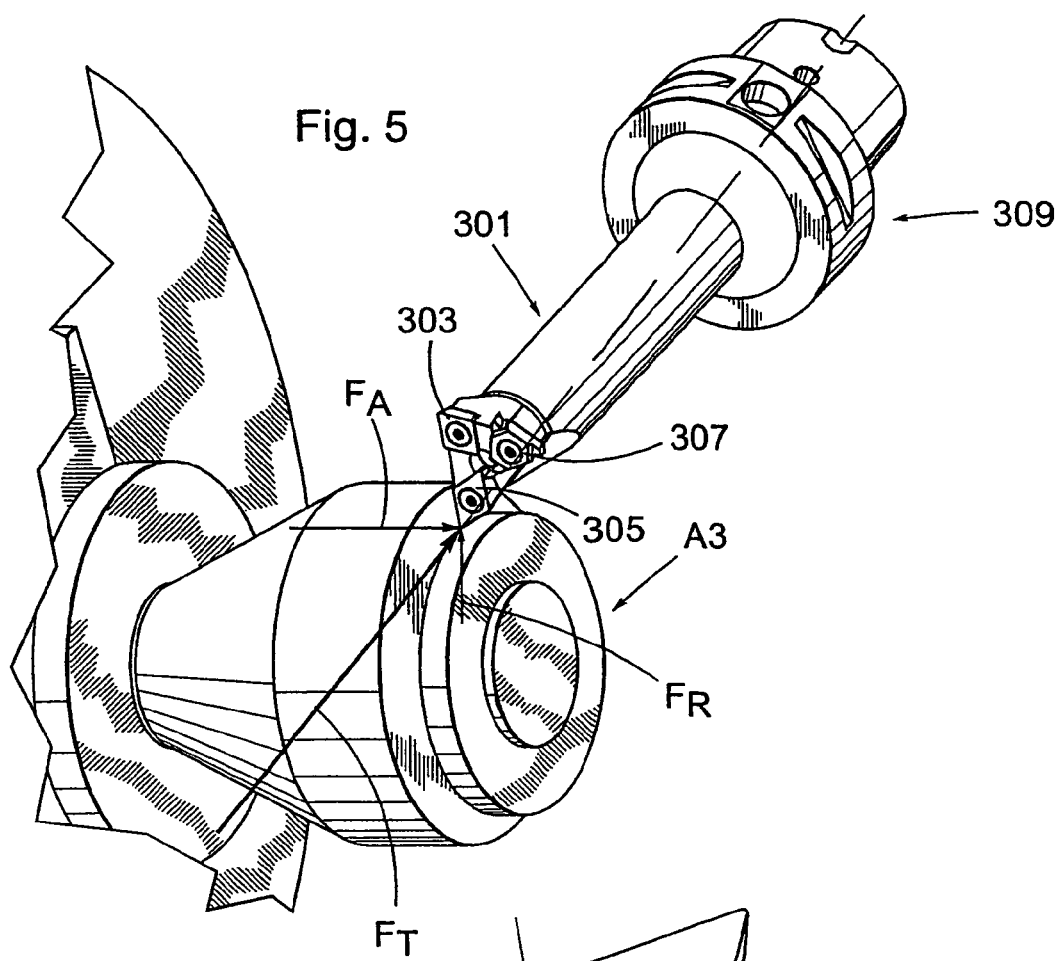
FIG. 5 shows, in a perspective view, an alternative embodiment of a tool according to the present invention, wherein the tool is in engagement with a workpiece and the forces acting on the tool.

In FIG. 5 shows how an embodiment of a tool according to the present invention is used. The holder 301 is now centrally (coaxially) oriented in relation to the securing portion 309. FIG. 5 shows schematically how one of three inserts 303, 305, 307, more exactly a copying insert 305, machines a work piece A3.

Figure 6:
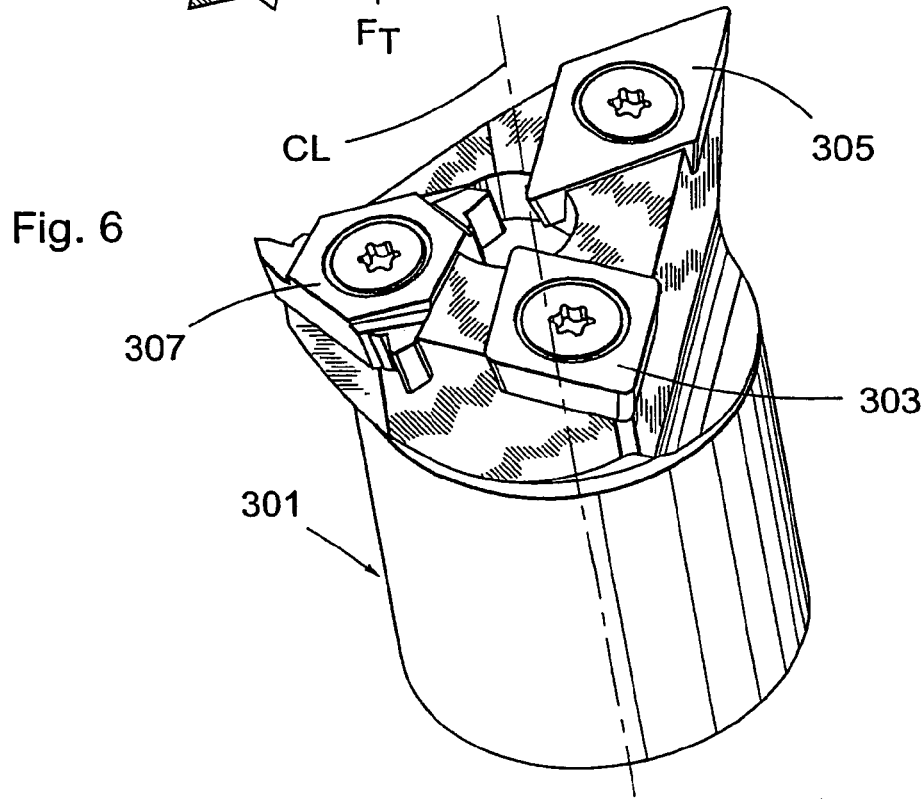
FIG. 6 shows in detail the cutting head of the tool according to FIG. 5.

Even more detail is shown in FIG. 6 of the inserts of the tool according to FIG. 5, wherein these inserts represent a typical set up of inserts. From FIG. 6 it appears how the holder 301 is equipped with a turning insert 303 for heavy duty machining, a copying insert 305 and a threading insert 307. These inserts 303, 305, 307 may been inclined at a certain angle α and/or β as above described.

Shown in FIG. 5 is how different forces affect the copying insert 305, wherein FT designates a tangential force; FA designates an axial force; and FR designates a radial force. The absolute biggest force that influences the insert is the tangential force FT, which in the embodiment according to FIG. 5 has a direction along the longitudinal direction of the holder 301. This means that the tangential force FT is absorbed by the holder 301 without causing a pronounced deflection of the holder 301. The force situation as shown in FIG. 5 entails also less tendency to vibrations than in conventional turning tools.

Figure 7:
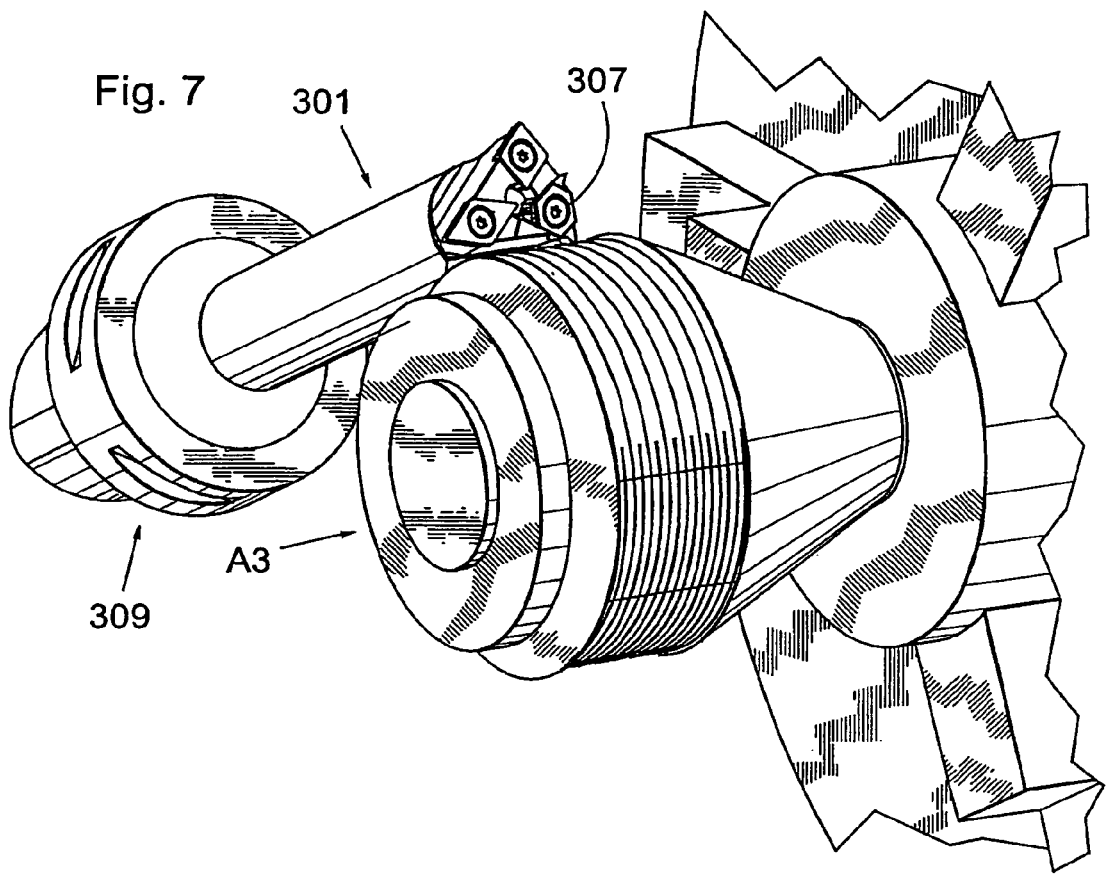
FIG. 7 shows how the tool according to FIG. 5 is used in threading.

In FIG. 7 is shown how the tool according to the present invention is used in order to make use of the threading insert 307 to produce a thread on the rotary work piece A3.

Figure 8:
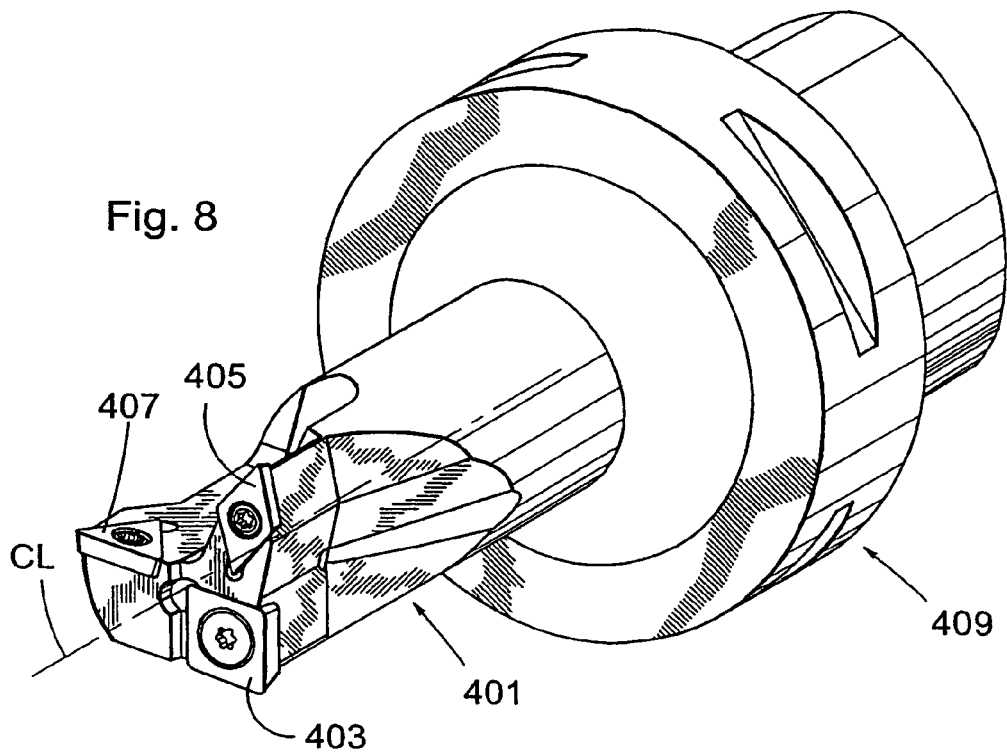
FIG. 8 shows in a perspective view an alternative tool according to the present invention, where two replaceable inserts are oriented according to principles of the present invention.

In FIG. 8 is shown an alternative embodiment of a tool according to the present invention. As is shown in FIG. 8 two replaceable indexible inserts 403 and 405 are oriented in relation to the holder 401 according to the principles of the present invention, i.e., the main plane of the inserts 403 and 405 extends laterally of the axial direction CL for the tool. A third insert 407 of the tool according to FIG. 8 has a conventional orientation on the holder 401. In the embodiment shown in FIG. 8 the insert 403 is a turning insert while the insert 405 constitutes a copying insert. The inserts 403 and 405 generally perform different types of machining, i.e. the insert 403 performs heavy duty machining while the copying insert 405 performs a finish machining.

Figure 9:
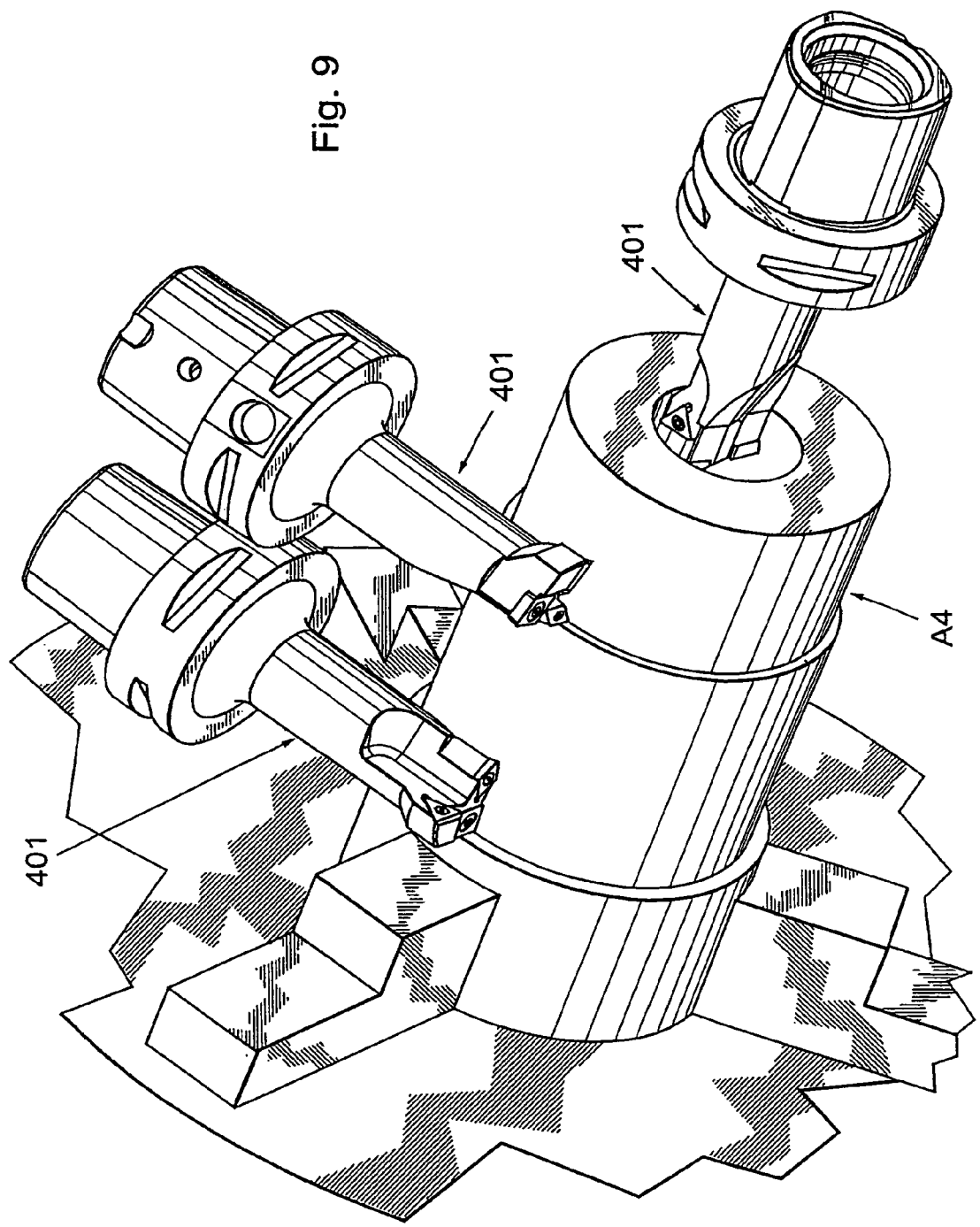
FIG. 9 shows, in a perspective view, the tool according to FIG. 8 during machining of a rotary work piece.

FIG. 9 shows examples of how the tool according to FIG. 8 is used when machining a rotary work piece A4. As is shown in FIG. 9 the conventional orientation of the insert 407 causes this insert for example to become useful for internal turning.

The turning tool according to the present invention thus carries a number of exchangeable inserts, preferably of different types, which entails that this turning tool by indexing thereof can be adjusted simply and quickly between different kinds of turning operations.

Conceivable Modifications of the Invention:

In the above described embodiments, the tool according to the present invention is equipped with inserts of three different types, which makes the tool useful in three different kinds of machining operations. However, one can within the limits of the invention also provide tools equipped with interchangeable inserts of only one or two types that are present in different quantities.

Generally, in all of the described embodiments of the tool according to the present invention as described the inserts are secured into their insert pockets by central screws. As this is outstanding conventional technique these screws have not been described in further detail. Within the limits of the present invention the interchangeable inserts might be secured in their insert pockets by alternative clamping means, wherein, in a not limiting sence, one example could include the use of a top clamp portion.

What is claimed is:

1. An indexible turning tool comprising a tool body including a securing portion and a holder projecting from the securing portion, the holder provided with pockets receiving respective replaceable cutting inserts, wherein each of the inserts has a main plane, the inserts all lying on a common reference plane oriented perpendicularly to a center axis of the holder, wherein indexing of the tool body about the center axis brings the inserts into a common operative cutting position, and wherein the orientation of the main plane of at least one insert when indexed about the center axis into the operative cutting position is different than the orientation of the main planes of the other inserts when they are indexed into the common operative cutting position.

2. The indexible turning tool according to claim 1, wherein the main plane of at least one insert forms an acute angle α with the reference plane, wherein the acute angle α lies in a plane oriented generally tangentially relative to a radius of the holder.

3. The indexible turning tool according to claim 2 wherein the acute angle α is in the range −45°≦α≦+45°.

4. The indexible turning tool according to claim 1, wherein the at least one insert forms an acute angle β with the reference plane, wherein the acute angle β lies in a plane containing the holder's center axis.

5. The indexible turning tool according to claim 4 wherein the acute angle β is in the range −45°≦β≦+45°.

6. The indexible turning tool according to claim 1, wherein at least two of the inserts have their respective main planes oriented laterally relative to the holder's center axis, wherein the inserts whose main planes are oriented laterally of the holder's center axis are configured differently from one another.

7. The indexible turning tool according to claim 1, wherein the main plane of at least one of the inserts is oriented substantially parallel to the holder's center axis.

8. The indexible turning tool according to claim 1, wherein the number of inserts consists of three, the three inserts being spaced circumferentially about the holder's center axis.

9. The indexible turning tool according to claim 1, wherein respective radial spacings of the inserts from the holder's center axis are different from one another.

10. An indexible turning tool comprising:
a tool body including a securing portion and
a holder projecting from the securing portion,
the holder provided with pockets receiving respective replaceable cutting inserts, the pockets arranged wherein indexing of the tool body about an indexing axis brings one of the inserts into an operative cutting position, wherein one of the inserts has a main plane oriented laterally relative to the indexing axis, each of the inserts having a plurality of corners including a radially outermost corner spaced radially farther from the indexing axis than the other corners of the insert,
wherein a reference plane oriented perpendicularly to the indexing axis and passing through the radially outermost corner of the one insert is spaced axially from the radial outermost corner of at least one other insert,
wherein every inserts is spaced circumferentially from every other insert about the holder's center axis.

11. The indexible turning tool according to claim 10, wherein the main plane of at least one insert forms an acute angle a with a perpendicular reference plane oriented perpendicularly to a center axis of the holder, wherein the acute angle a lies in a plane oriented generally tangentially relative to a radius of the holder.

12. The indexible turning tool according to claim 11 wherein the acute angle α is in the range −45°≦α≦+45°.

13. The indexible turning tool according to claim 10, wherein the at least one insert forms an acute angle 13 with a perpendicular reference plane oriented perpendicularly to a center axis of the holder, wherein the acute angle β lies in a plane containing the holder's center axis.

14. The indexible turning tool according to claim 13 wherein the acute angle β is in the range −°≦β≦+45°.

15. The indexible turning tool according to claim 10, wherein at least two of the inserts have their respective main planes oriented laterally relative to the holder's center axis, wherein the inserts whose main planes are oriented laterally of the holder's center axis are configured differently from one another.

16. The indexible turning tool according to claim 10, wherein the main plane of at least one of the inserts is oriented substantially parallel to the holder's center axis.

17. An indexible turning tool comprising a tool body including a securing portion and a holder projecting from the securing portion, the holder provided with pockets receiving respective replaceable cutting inserts, the pockets arranged wherein indexing of the tool body about an indexing axis brings one of the inserts into an operative cutting position, wherein one of the inserts has a main plane oriented laterally relative to the indexing axis, each of the inserts having a plurality of corners including a radially outermost corner spaced radially farther from the indexing axis than the other corners of the same insert, wherein a reference plane oriented perpendicularly to the indexing axis and passing through the radially outermost corner of the one insert is spaced axially from the radial outermost corner of at least one other insert,
wherein the respective radial spacings of the inserts from the holder's center axis are substantially the same.

18. An indexible turning tool comprising a tool body including a securing portion and a holder projecting from the securing portion, the holder provided with pockets receiving respective replaceable cutting inserts, the pockets arranged wherein indexing of the tool body about an indexing axis brings one of the inserts into an operative cutting position, wherein one of the inserts has a main plane oriented laterally relative to the indexing axis, each of the inserts having a plurality of corners including a radially outermost corner spaced radially farther from the indexing axis than the other corners of the insert, wherein a reference plane oriented perpendicularly to the indexing axis and passing through the radially outermost corner of the one insert is spaced axially from the radial outermost corner of at least one other insert,
wherein the turning tool does not include inserts positioned at the same azimuth from the holder's center axis with respect to rotation about the holder's center axis.

19. An indexible turning tool comprising a tool body including a securing portion and a holder projecting from the securing portion, the holder provided with pockets receiving respective replaceable cutting inserts, the pockets arranged wherein indexing of the tool body about an indexing axis brings one of the inserts into an operative cutting position, wherein the inserts have main planes oriented laterally relative to the indexing axis, each of the inserts having a plurality of corners including a radially outermost corner spaced radially farther from the indexing axis than the other corners of the same insert, wherein a reference plane oriented perpendicularly to the indexing axis and passing through the radially outermost corner of the one insert is spaced axially from the radial outermost corner of at least one other insert,
wherein the inserts are indexable relative to the holder about respective centers of indexing in the main planes of the respective inserts, and the respective radial spacings of the centers of indexing of the inserts from the holder's center axis are the same as one another.

* * * * *